May 13, 1930.  R. S. GANS  1,758,695
LOCKABLE LEVER CONTROL MECHANISM
Filed Feb. 3, 1928    2 Sheets-Sheet 1
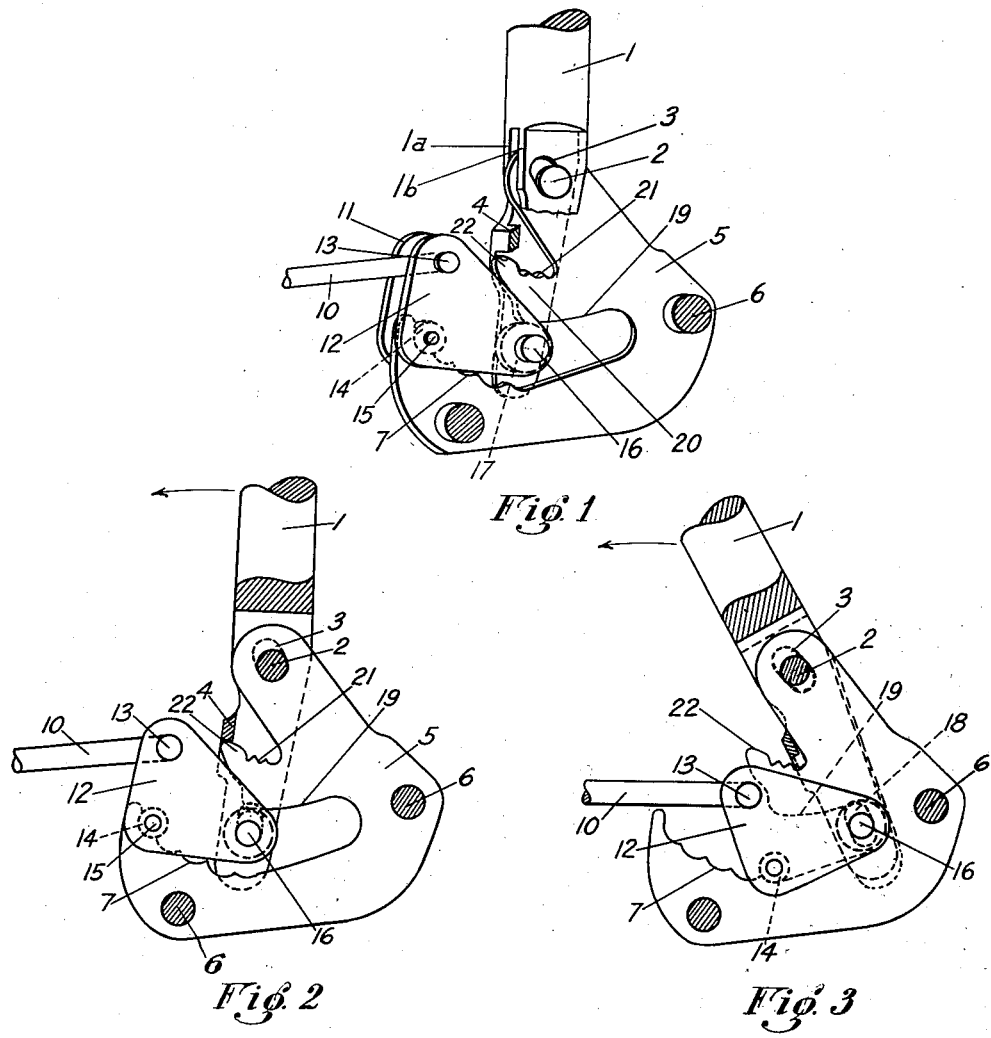
INVENTOR.
Robert S. Gans.
BY
ATTORNEY.

May 13, 1930.    R. S. GANS    1,758,695

LOCKABLE LEVER CONTROL MECHANISM

Filed Feb. 3, 1928    2 Sheets-Sheet 2

INVENTOR.
Robert S. Gans.
BY
ATTORNEY.

Patented May 13, 1930

1,758,695

UNITED STATES PATENT OFFICE

ROBERT S. GANS, OF DETROIT, MICHIGAN

LOCKABLE LEVER-CONTROL MECHANISM

Application filed February 3, 1928. Serial No. 251,532.

This invention relates to a lockable lever control mechanism which is adapted for use for controlling apparatus which exerts a pull such as a brake for an automotive vehicle or the like.

The invention is concerned largely with a control lever associated with other mechanism in which the lever is directly operable to apply or release the brakes or the like, wherein the tension of the brakes is utilized by the said mechanism for holding the parts in locked position. Thus the necessity of a manually operable locking or catching device such as a pawl and ratchet which is customarily used in brake levers is eliminated. Such an arrangement is shown and described in my copending application Serial No. 234,119, filed November 18, 1927.

The present invention is directed more particularly to an improved construction for effecting a positive lock so that accidental release of the brakes or the like may be prevented. The invention contemplates a construction wherein but a single member need be operated, both to apply the brakes and to effect the locking, and this member is the lever. Accordingly, the lever is mounted so that it is capable of being moved in a plurality of ways, one of which may be the usual pivotal movement on its fulcrum for applying the brakes, and the other of which may be for effecting the positive lock.

In the accompanying drawings:

Fig. 1 is a perspective view with parts cut away, showing a lever and mechanism constructed in accordance with the invention.

Fig. 2 is a side elevation of the construction shown in Fig. 1 with certain parts cut away showing the parts in brake released position.

Fig. 3 is a view similar to Fig. 2 showing the parts in brake applied position and indicating in dotted lines the manner in which the lever may be moved to effect positive locking.

Figure 4:
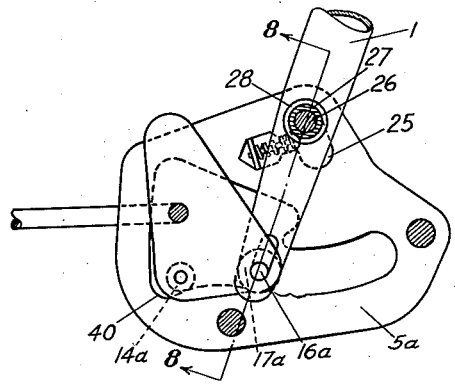
Fig. 4 is a side elevational view of a modified form of the invention wherein the lever is movable to effect positive locking wherein the locking arrangement per se is modified.

As shown in Fig. 1, there is a lever 1 fulcrumed on pin 2, the lever having an elongated slot 3 for the pin. The upper end of the lever, that is, the end which is to be grasped by an operator, is not shown, but the lower end is preferably bifurcated, having parts 1ª and 1ᵇ. Connecting these two parts is a cross member 4 which serves as a locking member which will later be brought out. Fixed to the frame or other suitable stationary part is a plate-like member 5 which may be secured by means of rivets or bolts 6. This plate-like member has a corrugated portion 7.

A brake rod 10 is to be actuated by the lever 1 but it is connected to the lever by an intermediate device which may take the form of two plates in the nature of stampings 11 and 12 with the brake rod pivoted thereto as at 13. A roller 14 is rotatably carried by a pin 15. A pin 16 is also carried by these two plates and between the plates is mounted a second roller 17. The lower end of the lever 1 is associated with the pin 16 by means of elongated slots in the bifurcated parts of the lever, as shown at 18. The member 5 is provided with a guideway in the nature of a slot for the roller 17, having a surface 19, preferably struck on an arc around the fulcrum pin 2.

The lever and brake rod arrangement including the intermediate connection is designed to operate in accordance with the disclosure in my copending application above referred to. When the lever is pulled by an operator in the direction of the arrows indicated in Figs. 2 and 3 the parts are moved from the position shown in Fig. 2 to a position which approximates that in Fig. 3. This pulls the brake rod and applies the brakes. The pull of the brake rod is divided into components so that the roller 14 is forced down in one of the furrows of the corrugated member and the pin 16 is urged upwardly.

Thus, the pull on the brake rod in itself locks the brakes and the harder the pull on the rod the tighter the roller is held in the furrow, thus holding the brake applied. In my copending application the upward component and the pin 16 is overcome by a direct compression of the lever which is overcome by the fulcrum of the lever. However, in the present instance the roller 17 contacts with the surface 19 so that the upward component is met with and overcome by this surface, thus leaving the lever free.

Thus, the brakes can be readily applied or released by merely reciprocating the lever on its fulcrum to move the parts to and from positions shown in Figs. 2 and 3. With the parts in locked position as shown in Fig. 3, however, the brakes may be released by movement of the lever by accidental striking of the upper end of the lever. For the purpose of effecting locking, to prevent this, the lever has been mounted on the pins 2 and 16 by means of elongated slots so that the lever can be moved. The plate 5 is provided with a portion 20 provided with notches 21 and a cam-like surface 22. When the parts are in the full line positions of Fig. 3, the brakes are applied. Now, to effect a positive lock the lever is pushed downwardly to the dotted line position so that the cross member 4 on the lever is engaged on one of the notches. These notches are arranged in proper radial position with respect to the furrows so that when a roller 14 is in one of the furrows the locking member 4 may be engaged in one of the notches. This positively locks the lever against accidental movement. To release the brakes the lever must first be pulled upwardly and then moved back to the position shown in Fig. 2. In order to insure that the lever remains upwardly while the brakes are released, so that they can be readily applied without interference of the notches 21 and member 4, the cam-like surface 22 is provided. When the brakes are released the cross member 4 engages the member 22 so that the lever is at all times up and ready for the brakes to be applied.

In the modified form shown in Figs. 4 to 8, inclusive, the general arrangement embodying the lever, brake rod, corrugated member, and the intermediate device connecting the brake with the lever, is the same as that just above described as regards its general operation. It is not necessary, therefore, to again describe this arrangement except as to the details of the modification.

In this form, the plate $5^a$ is provided with an elongated opening 25. The parts $1^a$ and $1^b$ on the lever straddle the plate, and the lever is fulcrumed on the plate by a bolt 26. Preferably a sleeve 27 surrounds this bolt, and rings or bushings 28 are placed on the ends of the bolt, and the assembly can be completed by tightening nuts 30. The opening in the lever through which the bolt and the sleeve pass fits nicely along the sleeve. By utilizing the sleeve the nuts 30 can be tightened, and lock washers may be used if desired, and the sleeve limits the tightening action so that there is no chance of squeezing together the bifurcated legs of the lever, so as to bind and interfere with the pivotal movement of the lever.

The lower ends of the members $1^a$ and $1^b$ of the lever are provided with elongated openings 31 through which a pin $16^a$ extends. This pin $16^a$ passes through the intermediate members $11^a$ and $12^a$ for rotatably supporting the roller $17^a$.

It will be noted that the two intermediate members $11^a$ and $12^a$ are extended upwardly to a point adjacent the fulcrum pin 26. The parts are shown in brake released position in Fig. 4, whereas in Fig. 5 the parts are shown in brake applied position. In this position, the brakes are held applied by reason of the roller $14^a$ being engaged in one of the furrows of the corrugated portion $7^a$.

Figure 6:
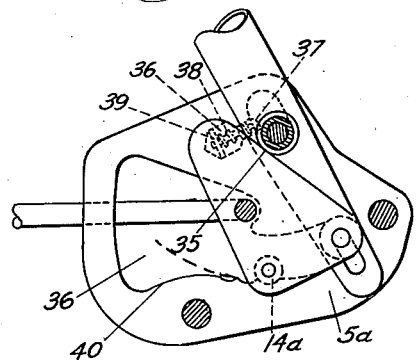
Fig. 6 is a view similar to Fig. 5 but showing the lever in shifted position to effect the positive lock.

To lock the mechanism in brake applied position the lever is now pushed downwardly. In this action the lever slides with respect to the pin $16^a$; the fulcrum pin 26 moves down with the lever in the slot 25. As shown in Fig. 6, the collars 28 are now in engagement with the plates $11^a$ and $12^a$ at the point numbered 35. It will be appreciated that movement of the lever to release the brakes causes the roller $14^a$ to move up and down over the corrugated portions. This causes a slight bobbing movement of the plates $11^a$ and $12^a$ around the pin $16^a$. To state the action in another manner, the plates at the point 35 would have a movement toward and away from the fulcrum pin 26. Inasmuch as the plates are in contact with the collars on the fulcrum pin the plates cannot move up to permit the roller $14^a$ to be disengaged from the furrow, and thus the parts are positively locked in brake applied position.

Figure 7:
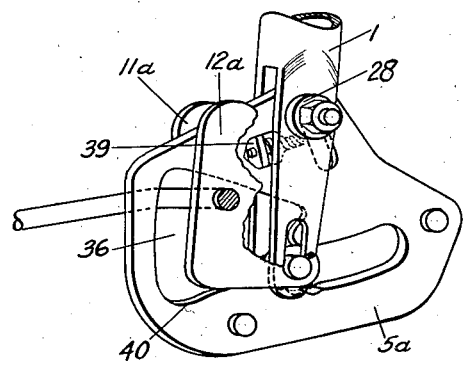
Fig. 7 is a perspective view of a construction with some of the parts cut away.
Figure 8:
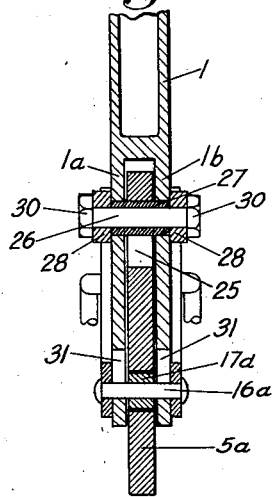
Fig. 8 is a sectional view taken on line 8—8 of Fig. 4.

It is preferable to provide some controlling feature for the reciprocable movement of the lever. For this purpose the plate $5^a$ is provided with a cut out portion 36 in which is placed a plunger 37, which contacts with the sleeve around the fulcrum pin. A spring referenced 38 is backed up by a washer 39. As shown in Fig. 7, this washer may be square and is of sufficient width so as to be in substantial engagement with the two plates $11^a$ and $12^a$. As viewed in Figs. 4 and 5, it will be noted that the washer is always between these plates and therefore it cannot get out of the slot in the plate $5^a$. The head of the plunger is held in a similar manner, in that it is at all times disposed between the two bifurcated portions of the lever, so that it cannot get out of place. No other fastening devices are required for this plunger mechanism.

Thus it will be seen that a snap-over action is provided for the lever. In Fig. 4 the lever is pulled upwardly and it is resiliently held in this position by reason of the plunger contacting with the lower side of the sleeve on the fulcrum pin. When the lever is pushed down to lock the brakes there is a snap action by reason of the spring 38 whereupon the lever is resiliently held downwardly by reason of the plunger contacting with the upper side of the sleeve, as shown in Fig. 6.

It will be seen therefore that the brakes can be applied and released by the mere pull and push of the lever and can be locked, upon the option of the operator, by pushing the lever downwardly. In this form of the invention the plate 5ª may have a contiguous boundary provided with a central opening 36 in which the connections etc. of the plates 11ª and 12ª operate, although it is within the invention to cut away this plate after the manner shown in Fig. 1.

Figure 5:
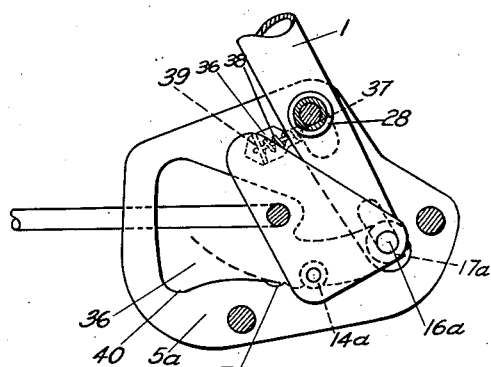
Fig. 5 is a view similar to Fig. 4 showing the parts in brake applied position.

The corrugated section of the member 5ª is preferably positioned on a curve which corresponds substantially to an arc around the center of the fulcrum pin 26 in its position shown in Figs. 1 and 5. To the rear of the corrugated portion, however, is a smooth surface 40 upon which the roller 14ª rides when slack in the brake is being first taken up. This surface preferably falls away from the arc; the falling away is indicated by the dotted lines (Figs. 5 and 6) which are taken on the arc. Thus, when the brakes are released the members 11ª and 12ª fall away somewhat; in other words, they back away from the fulcrum pin 26. This, as shown in Fig. 4, spaces the two members at sufficient distance from the fulcrum pin so that they will not be acted upon or locked should the lever be depressed while in this position.

Another advantage of this construction is that a greater degree of movement of the brake rod may be effected without the necessity of a greater lever movement. Thus when the lever is moved from the position shown in Fig. 5, slack in the brake is taken up more rapidly as the roller travels along the surface 40, and when the brakes begin to tighten the slack is taken up more slowly because the roller 14ª by this time has reached the corrugated section which is struck on an arc around the fulcrum pin.

Claims:

1. In an apparatus for controlling brakes or the like, the combination of a lever, a brake rod, an intermedate device connecting the lever and brake rod adapted to retain the brakes applied in any position in which they are set by the lever, means cooperating with the intermediate device for this purpose, and locking means engageable by independent movement of the lever for positively locking the intermediate device.

2. In an apparatus for controlling brakes or the like, the combination of a lever, a brake rod, an intermediate device connecting the lever and brake rod, means cooperating with the intermediate device so that the same is adapted to retain the brakes applied in any position in which they are set by the lever, a locking device on the lever arranged to normally permit free movement but which is moved to locking position by independent movement of the lever to lock the intermediate device in brake holding position.

3. In an apparatus for controlling brakes or the like, the combination of a pivoted lever arranged to move bodily with respect to its pivot point, a brake rod, an intermediate device connecting the brake rod and lever, means cooperating with the intermediate device so that the same is adapted to hold the brakes in applied position in any position set by the lever, and locking means engageable by the said bodily movement of the lever.

4. In an apparatus for controlling brakes or the like, the combination of a pivoted lever arranged to move bodily with respect to its pivot point, a brake rod, an intermediate device connecting the brake rod and lever, means cooperating with the intermediate device so that the same is adapted to hold the brakes in applied position in any position set by the lever, and locking means engageable by the said bodily movement of the lever including an engaging member movable with the lever.

5. In an apparatus for controlling brakes or the like, the combination of a lever, a fulcrum pin for the lever, so arranged as to permit bodily movement of the lever, a brake rod, an intermediate device connecting the brake rod and lever, means cooperating with the intermediate device so that the same is adapted to hold the brakes applied in any position in which they are set by the lever, the said fulcrum pin being adapted to engage the intermediate device upon said bodily movement of the lever to lock said device in brake holding position.

6. In an apparatus for controlling brakes or the like, the combination of a lever, a fulcrum pin therefor, means having an elongated slot by which the fulcrum pin is mounted, a brake rod, an intermediate device connecting the brake rod and lever which actuates upon movement of the lever to control the brakes, said intermediate device extending in close proximity to the fulcrum pin, said fulcrum pin being adapted to engage the intermediate device to hold the same against actuation and thus lock the same in brake holding position.

7. An apparatus for controlling brakes or the like, comprising in combination, a lever pivotally and slidably mounted, a brake rod, an intermediate device connecting the brake rod and lever which controls the brakes upon pivotal movement of the lever, said intermediate device having an actuating movement upon movement of the lever, and locking means brought into engagement with the intermediate device upon sliding movement of the lever.

8. An apparatus for controlling brakes or the like, comprising in combination, a lever mounted for pivotal and sliding movement, a brake rod, an intermediate device connecting the brake rod and lever for applying and releasing the brakes upon pivotal movement of the lever, said intermediate device having an actuating movement, and means on the lever for engaging the intermediate device to lock the same in brake applied position by the sliding movement of the lever.

9. An apparatus for controlling brakes or the like comprising in combination, a lever mounted for pivotal and sliding movement, a brake rod, an intermediate device connecting the brake rod and lever for applying and releasing the brakes upon pivotal movement of the lever, means on the lever for engaging the intermediate device to lock the same in brake applied position by the sliding movement of the lever, said intermediate device including a rockable member which is locked from rocking by the said means on the lever, and means providing a corrugated surface cooperating with the rockable member whereby the intermediate device holds the brakes applied in any position in which they are set by the lever.

10. An apparatus for controlling brakes or the like, comprising in combination a lever provided with an elongated slot, a fulcrum pin in the slot, a brake rod, an intermediate device connecting the lever and brake rod which actuates relative to the lever upon movement of the lever for brake control and means for engaging the intermediate device by a movement of the lever on its slotted connection with the fulcrum pin to lock said device from actuation relative to the lever to hold the brakes in applied position.

11. An apparatus for controlling brakes or the like comprising in combination a lever provided with an elongated slot, a fulcrum pin in the slot, a brake rod, an intermediate device connecting the lever and brake rod which actuates relative to the lever upon movement of the lever for brake control, means for engaging the intermediate device by a movement of the lever on its slotted connection with the fulcrum pin to lock said device from actuation relative to the lever to hold the brakes in applied position, and a pin and slot connection between the lever and the said intermediate device.

12. An apparatus for controlling brakes or the like, comprising in combination, a lever provided with an elongated slot, a fulcrum pin in the slot, a brake rod, an intermediate device connecting the lever and brake rod which actuates relative to the lever upon movement of the lever for brake control, means for engaging the intermediate device by a movement of the lever on its slotted connection with the fulcrum pin to lock said device from actuation relative to the lever to hold the brakes in applied position, and spring pressed means for holding the fulcrum pin in either end of the slot in which it is mounted.

13. An apparatus for controlling brakes or the like comprising in combination a lever provided with an elongated slot, a fulcrum pin in the slot, a brake rod, an intermediate device connecting the lever and brake rod which actuates relative to the lever upon movement of the lever for brake control, means for engaging the intermediate device by a movement of the lever on its slotted connection with the fulcrum pin to lock said device from actuation relative to the lever to hold the brakes in applied position, and spring pressed means for holding the fulcrum pin in either end of the slot in which it is mounted, said lever being connected to the intermediate device by a pin and slot connection.

14. An apparatus for controlling brakes or the like comprising in combination, a lever having a fulcrum pin, means provided with an elongated slot in which the fulcrum pin is mounted, a spring pressed plunger projecting into the slot for resiliently holding the fulcrum pin in either end of the slot, a brake rod, and an intermediate device extending in close proximity to the fulcrum pin and connecting the brake rod and lever, said intermediate device being arranged to actuate relative to the lever upon movement of the lever for brake control, the said fulcrum pin when moved to one end of the slot being adapted to engage the intermediate device and lock the same from such relative movement and hold the brakes in applied position.

15. An apparatus for controlling brakes or the like, comprising in combination a pivoted lever, a brake rod, means provided with a corrugated surface, an intermediate device connected to the lever and brake rod and including a member engageable with the corrugated member, the arrangement being such that a pull of the brake rod seats the said member in a furrow of the corrugation to hold the brakes in applied position, said corrugated portion being positioned substantially on an arc around the fulcrum pin as a center, the said means having the corrugated portion also providing a surface adjacent the corrugated surface which falls away from the said arc, whereby to effect a greater movement of the brake rod as the corrugation engaging member moves thereover.

16. In an apparatus for controlling brakes or the like, the combination of a lever, a brake rod, an intermediate device connecting the lever and brake rod which has an actuating movement when the lever is operated to control the brakes and locking means engageable by independent movement of the lever for positively locking the intermediate device against its actuating movement.

In testimony whereof I affix my signature.

ROBERT S. GANS.